United States Patent [19]
Relph

[11] Patent Number: 6,092,171
[45] Date of Patent: Jul. 18, 2000

[54] SYSTEM AND METHOD FOR USING A MEMORY MANAGEMENT UNIT TO REDUCE MEMORY REQUIREMENTS

[75] Inventor: Richard A. Relph, Austin, Tex.

[73] Assignee: Advanced Micro Devices, Inc., Sunnyvale, Calif.

[21] Appl. No.: 08/248,625

[22] Filed: May 24, 1994

Related U.S. Application Data

[63] Continuation-in-part of application No. 07/760,620, Sep. 16, 1991, abandoned.

[51] Int. Cl.$^7$ ..................................................... G06F 13/10
[52] U.S. Cl. ............................ 711/203; 395/114; 395/115
[58] Field of Search .................................... 395/400, 425, 395/114, 115

[56] References Cited

U.S. PATENT DOCUMENTS

| | | | |
|---|---|---|---|
| 5,105,284 | 4/1992 | Sakata et al. | 358/404 |
| 5,113,492 | 5/1992 | Aniki et al. | 395/147 |
| 5,115,493 | 5/1992 | Jeanblane et al. | 395/117 |
| 5,142,667 | 8/1992 | Dimperio et al. | 395/115 |
| 5,159,681 | 10/1992 | Beck et al. | 395/425 |

FOREIGN PATENT DOCUMENTS 3816627  11/1989  Germany .

OTHER PUBLICATIONS

"Memory Management", Chap. 7, *Am29030™ and Am29035™ Microprocessors, User's Manual and Data Sheet*, Advanced Micro Devices, Inc., 1991.

*Primary Examiner*—Kevin J. Teska
*Assistant Examiner*—Kyle J. Choi
*Attorney, Agent, or Firm*—Foley & Lardner

[57] ABSTRACT

The invention provides a system and a method for managing digital data in a computer peripheral device which receives the data from a host computer. The system includes a processing circuit which receives data from the host and uses the data to control the computer peripheral device. The system further includes a memory device which stores data and comprises a plurality of storage locations. The system still further includes a memory management unit for controlling the storage of data in the memory device. The system still further includes a compression program for effecting compressed storage of data in memory. The memory management unit determines when the amount of data stored in the memory device exceeds a predetermined threshold and generates a compression signal. The compression program responds to the compression signal by effecting compressed storage of data. In the preferred embodiment of the present invention, the plurality of storage locations comprising the memory device is arranged in ordered arrays of subsets of storage locations. The memory management unit determines when the amount of data stored in one particular subset of the ordered array of subsets exceeds a predetermined threshold and generates a compression signal.

13 Claims, 7 Drawing Sheets

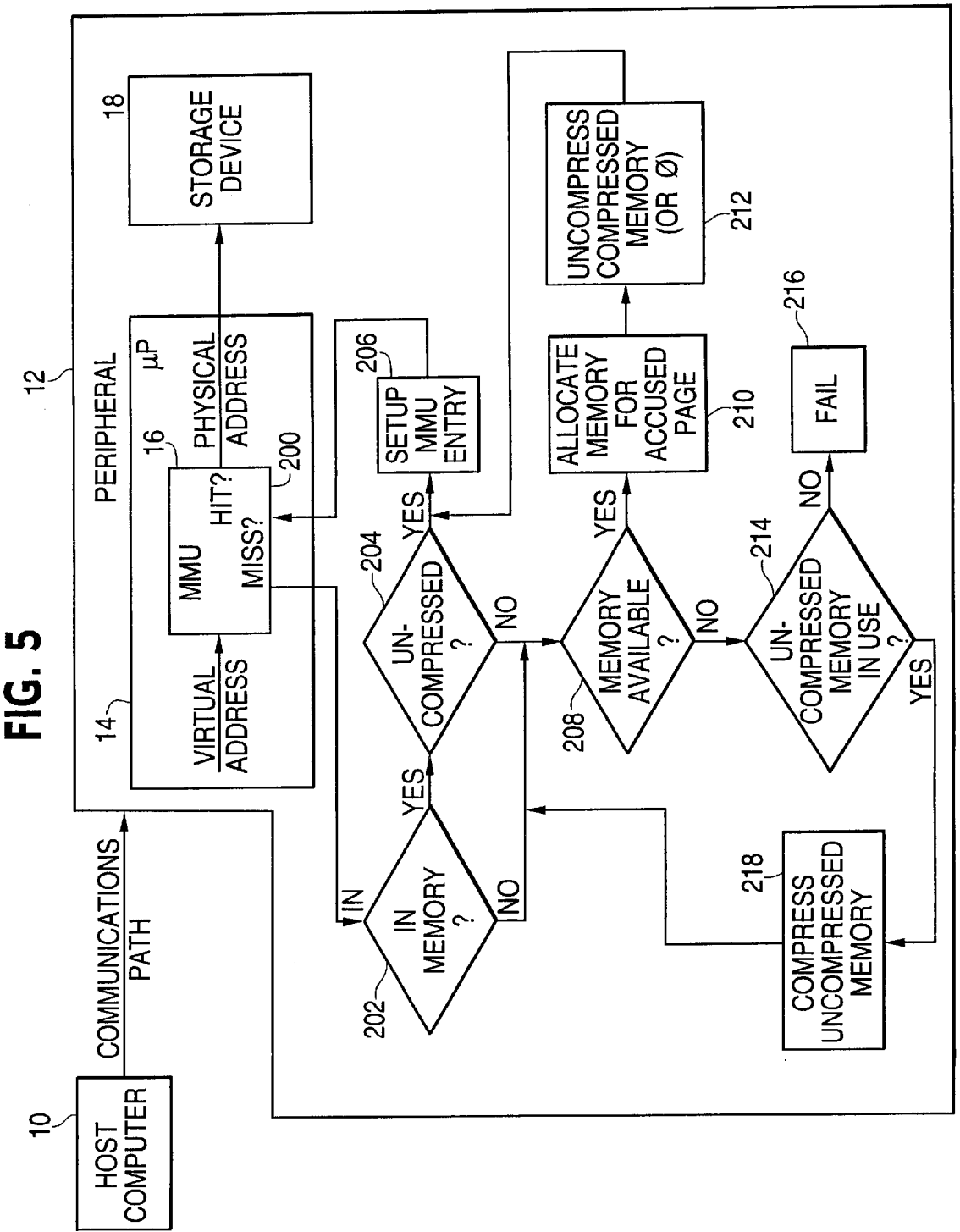

SYSTEM AND METHOD FOR USING A MEMORY MANAGEMENT UNIT TO REDUCE MEMORY REQUIREMENTS

CROSS REFERENCE TO RELATED APPLICATION

This is a continuation in part of application Ser. No. 07/760,620 filed Sep. 16, 1991, now abandoned.

BACKGROUND OF THE INVENTION

The present invention is generally directed to a system and method for using a memory management unit to reduce memory requirements for operation of a computer peripheral device. More particularly, the preferred embodiment of the present invention is useful for reducing the memory requirements for operation of a laser printer.

A laser printer is a computer peripheral device for producing printed copy output of digital data. Such a peripheral device is typically coupled to data processing equipment, such as a host computer or a local area network. In such an arrangement, the host computer transmits digital data to the laser printer which produces a graphic image representative of the received data. A typical laser printer may contain a microprocessor which responds to a control program, such as PostScript®[1], by translating data and instructions from the host computer into the scan and print patterns used by the laser printer. The instructions received by the laser printer are employed by the microprocessor responding to the control program to control the printing apparatus (the engine) of the laser printer.

[1] PostScript® is sold by Adobe Systems, Inc., Mountain View, Calif. 94039

In addition to a microprocessor, a typical laser printer may also contain a digital memory. Such memory may include a read-only memory ("ROM") containing the control program for the microprocessor and information describing, for example, the text fonts which are supported by the laser printer, and a random access memory ("RAM") for storing data. When the host computer transmits data to the laser printer, the microprocessor translates the received data into a bit map of the pattern of dots that comprise the text or graphics as they are to appear on a printed page. This process is known as rendering and the bit map is comprised of rendered data. The rendered data are then written into the RAM by the microprocessor. After data for an entire page have been received from the host and written as rendered data into the RAM, the rendered data are read from the RAM by the microprocessor and used to control operation of the laser printer engine. Printing is actually accomplished by the engine, the component of the laser printer which physically conveys the image onto the page.

Because the laser printer prints each single page only after receiving and rendering all of the data for that page, the RAM must be of sufficient size to hold the amount of rendered data associated with a page. In a typical application, such as a page rendered using the PostScript® printer control program, the rendered image of a page may comprise more than 1 megabyte ("MB") of data. In addition to rendered data storage, the printer control program itself may occupy 0.5 MB of RAM storage. As a result, total RAM storage requirements may be as great as 2 MB to allow printing of a single page.

These representative storage requirements are consistent with a print density of 300 dots per inch ("DPI"). Some laser printer applications require higher density printing, such as 480 or 600 DPI. Higher density printing allows finer resolution of the printed text and graphics. However, higher density printing also requires an increased number of dots to form an image on the page. Consequently, higher density printing operation of a laser printer increases the RAM storage requirements of the laser printer. Such large RAM requirements often result in higher cost and slower operation of a laser printer and, thus, have limited the application of laser printers with memory-intensive operations, such as high density printing, in the past.

Prior art attempts at improving operational speed in managing large amounts of data in computer peripheral devices such as laser printers have principally relied on increasing the amount of on-board physical memory, i.e., RAM. Generally, physical memory is distinguished from virtual memory in that physical memory is directly addressable by the microprocessor. A virtual memory system requires address translation techniques, well known in the art, to convert the virtual address to the physical address in RAM or in a mass storage device such as a disk drive. Prior art designs of computer peripheral devices have generally lacked these virtual memory techniques. In such prior art designs, applications that required 2 MB of RAM storage required at least 2 MB of on-board physical memory in the laser printer. Integrated circuits including on-board RAM constitute a substantial portion of the cost of a laser printer. Thus, providing sufficient RAM in a laser printer for memory intensive applications, such as high density printing or advanced graphics capability, adds substantially to unit cost; a larger RAM also occupies considerable "real estate" in a printed circuit in the laser printer, and reduces system reliability for the laser printer. Thus, the net effect in such prior art designs is to increase the overall cost and reduce the operational effectiveness of the laser printer.

The present invention overcomes these limitations in memory-intensive operations and provides other advantages over the prior art. The present invention provides an on-board memory management unit to manage the storage of data and reduce memory requirements. The present invention allows virtually-addressed data to be stored in a compressed format in physical memory where they are not directly accessed by the microprocessor. Storage and retrieval in virtual memory is controlled by a memory management unit integral to the invention. The memory-management unit responds to a software control program which monitors system status and directs memory management unit action. The memory management unit provides address translation to create a virtual memory system in which data are moved within the RAM, rather than between RAM and disk. Storing data in a compressed format reduces the total memory required for data storage. Reduction in memory requirement in turn reduces system cost and complexity and improves system reliability.

SUMMARY OF THE INVENTION

The invention provides a system and a method for managing digital data in a computer peripheral device which receives the data from a host computer. The system includes a processing means which receives data from the host computer and uses the data to control the computer peripheral device. The system further includes an on-board memory means which stores data and comprises a plurality of storage locations. The system still further includes a memory management means for controlling the storage of data in the memory means. The system still further includes a compression means for effecting compressed storage of data in the memory means. The memory management means determines when the amount of data stored in the memory device exceeds a predetermined threshold and generates a compression signal. The compression means responds to the compression signal by effecting compressed storage of data within the memory means.

The plurality of storage locations comprising the memory means is arranged in ordered arrays of subsets of storage locations. Preferably, the memory management means controls communication of data between a first subset of the ordered array of subsets and a second subset of the ordered array of subsets after compressed storage of the data has been effected.

In the preferred embodiment, the memory management means directs storage of data by the processing means in each subset of the ordered array of subsets. Storage is effected until the amount of data stored in a selected subset exceeds a predetermined threshold for that selected subset. When the threshold for the selected subset is reached, the memory management means then generates a compression signal for the system. The compression means responds to the compression signal by effecting compressed storage of data in the selected subset. The system is flexibly designed so that each respective subset may be treated as a selected subset for compression treatment by the memory management means.

The various subsets are hierarchically designated so that when compression of data within a first subset yields available storage capacity within the first subset, the memory management unit may direct data stored within a second subset for storage within the now-vacant storage available in the first subset. Preferably data shifted from the second subset will be stored within the first subset in compressed form. Thus, additional storage is made available in the second subset.

Storage of data within the second subset is then accomplished in a non-compressed form until the threshold of the system is reached.

It is true that, as a practical matter, decompression and retrieval of compressed data is slower than retrieval of non-compressed data, and it is true that some additional on-board storage is occupied by programming information necessary for compression of data (and for decompression of data when the data is later retrieved).

It is, therefore, an object of the present invention to provide a system and method for using an on-board memory management unit in a computer peripheral device to reduce memory requirements for operation of the computer peripheral device by directing the storage of data in selected subsets of an on-board memory device, compressing the data into a format which requires less physical memory, and moving the data in compressed format among subsets of the memory device to allow storage of uncompressed data to continue.

It is a further object of the present invention to provide a system and method for using an on-board memory management unit in a computer peripheral device to reduce memory requirements by allowing data to be freely moved among subsets of on-board storage sites in both compressed and uncompressed formats.

Further objects and features of the present invention will be apparent from the following specification and claims when considered in connection with the accompanying drawings illustrating the preferred embodiment of the invention.

BRIEF DESCRIPTION OF THE DRAWINGS

FIG. 5 is a schematic flow chart illustrating the method of using the memory management unit of the present invention.

DETAILED DESCRIPTION OF THE INVENTION

Figure 1:
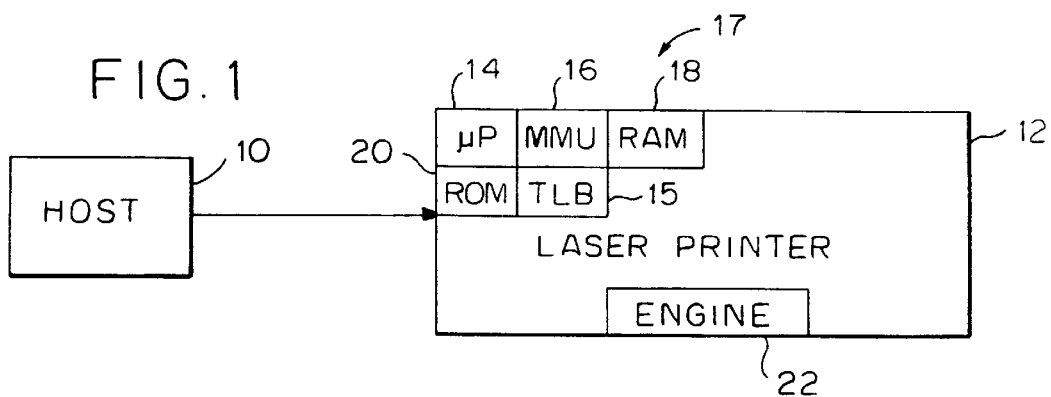
FIG. 1 is a block diagram of a system in which the present invention may be employed, including a host computer and a peripheral laser printer.

FIG. 1 is a block diagram of a system in which the present invention may be employed. In FIG. 1, a host computer 10 transmits data to a laser printer 12. Host computer 10 and laser printer 12 may be directly coupled or may be coupled over a local area network (not shown) which is connectable to other data processing devices (not shown).

Laser printer 12 includes a microprocessor ("$\mu p$") 14, a memory management unit ("MMU") 16, memory 17 which may include random access memory ("RAM") 18 and read only memory ("ROM") 20, and an engine 22. MMU 16 includes a translation lookaside buffer 15. Microprocessor 14 receives data from host computer 10 and processes the received data in response to instructions in a control program contained in memory 17. Microprocessor 14 uses the instructions and information contained in memory 17 to translate data from host computer 10 into the pattern of data required by engine 22 to form a readable symbol representative of the received data. This process is generally known as rendering the data.

There is preferably a one-to-one correspondence between the storage locations of RAM 18 and dot locations on the page to be printed (not shown) by engine 22. The data in RAM 18 are preferably in a pattern of logical "0's" and "1's", which pattern corresponds to the pattern of white and black regions on the printed page to be produced by engine 22. For example, a "1" stored in RAM 18 may cause engine 22 to produce a dot on the page, and a "0" in RAM 18 may cause engine 22 to leave the corresponding dot on the page white. Microprocessor 14 renders the data it receives from host computer 10 according to information contained in ROM 20, and then stores the rendered data in RAM 18. After an entire page of data has been rendered and accumulated in RAM 18, microprocessor 14 transmits the rendered data from RAM 18 to engine 22, and engine 22 prints the page. The process by which engine 22 prints the page is known as imaging.

In order to facilitate understanding of the invention, like elements will be referred to by like reference numerals in the various drawings.

Figure 2:
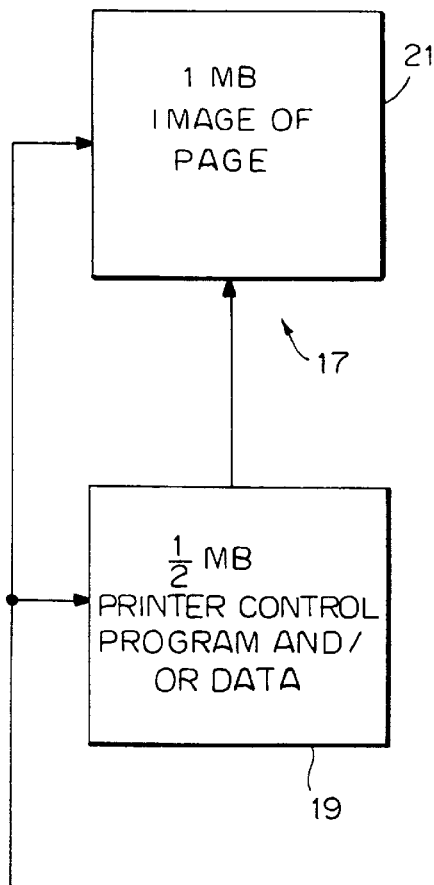
FIG. 2 is a block diagram illustrating memory usage in a prior art implementation of a laser printer.

FIG. 2 is a block diagram illustrating memory usage in RAM 18 in a prior art implementation of a laser printer. The control program which directs microprocessor 14 typically occupies a portion 19 of memory 17, preferably ROM 20. Portion 19 typically has a capacity of approximately 0.5 megabyte ("MB"). The rendered image of a page typically occupies a portion 21 of memory 17, preferably RAM 18. Portion 21 typically has a capacity of approximately 1 MB. Generally, each individual storage location in portion 21 of RAM 18 corresponds to a dot on the printed page to be produced. For example, initially all storage locations in portion 21 of RAM 18 may be set to "0", corresponding to a blank page. As microprocessor 14 stores rendered data in RAM 18, some of the storage locations remain set to "0" and some are reset to "1". In the prior art implementation illustrated in FIG. 2, microprocessor 14 stores rendered data by randomly accessing storage locations in RAM 18.

The sequence in which microprocessor 14 receives data may not correspond to the sequence in which the data will be imaged. Host computer 10 may transmit at widely differing times data which will create physically adjacent patterns on the imaged page after completion of imaging. For example, host computer 10 may transmit textual information first, and may then transmit graphical data, such as when a border is placed around a page of text.

If such time-differing data transmission occurs, when microprocessor 14 renders the graphical data, microprocessor 14 must access the same areas of RAM 18 as are accessed when rendering the textual data. This is because of the one-to-one correspondence between storage locations in RAM 18 and dots on the page. For example, rendered data for the top line of text on a page and the border around the text may be located at approximately the same address (i.e., the same logical location) in RAM 18. Thus, in the prior art design illustrated in FIG. 2, microprocessor 14 must be able to access all storage locations in RAM 18 at all times.

Because of this need for continuous and complete access to storage locations in RAM 18 by microprocessor 14, and because of the need to store rendered data for an entire page, prior art laser printer implementations have generally provided large, unitary portions of RAM for storage of data. However, some laser printer applications require higher density printing, which is achieved by printing more dots per inch. For example, one standard printing density is 300 dots per inch ("DPI"). Higher density applications may require 480 DPI, or even 600 DPI. Such higher density requires more RAM to hold the rendered data. As the printing density is increased, the size of the storage space provided in RAM must also increase.

Such a requirement for increased storage capacity is a serious problem in a laser printer, as it is with any computer peripheral device. RAM integrated circuits which generally implement on-board storage capacity in computer peripheral devices usually constitute a substantial portion of the cost of manufacture of such peripheral devices. In addition, RAM integrated circuits require substantial physical space ("real estate") in the on-board circuitry of a laser printer. Accommodating such high real estate requirements and providing the printed circuit board interconnections necessary for such accommodation increase the manufacturing cost of laser printers. In addition, such extra fabrication and additional connections decrease manufacturing yields and product reliability simply because they provide more opportunities for component or interconnection failure. Thus, a requirement for large amounts of RAM to accommodate high density printing or other memory-intensive operations imposes significant limits on the prior art design.

Figure 3A:
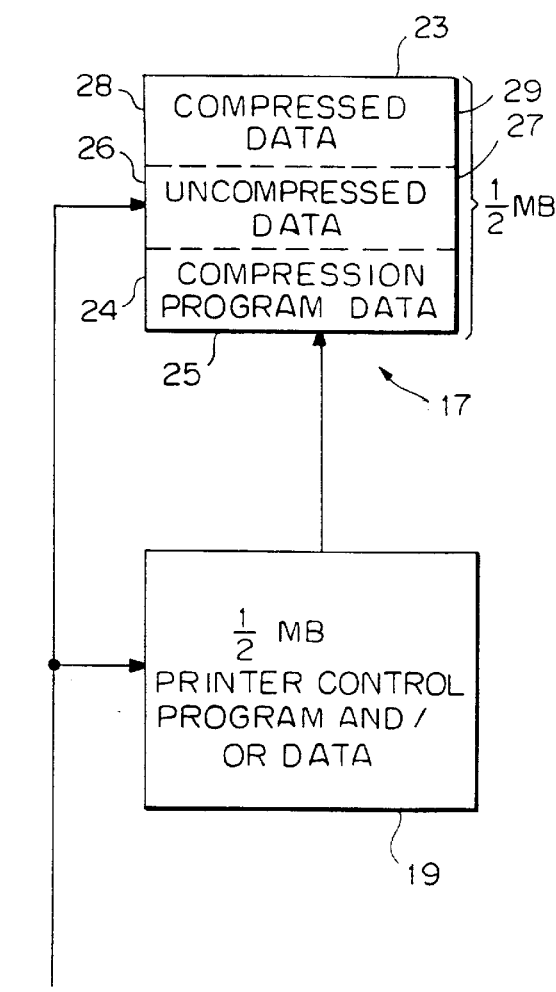
FIG. 3A is a block diagram illustrating memory usage in a computer peripheral device employing the present invention.

FIG. 3A is a block diagram illustrating memory usage in a computer peripheral device employing the present invention.

In FIG. 3A, the control program which directs microprocessor 14 typically occupies a portion 19 of memory 17, preferably in ROM 20. Portion 19 typically has a capacity of approximately 0.5 MB of memory in memory 17, as in the prior art. In contrast to the prior art, however, the rendered image of a page in the present invention typically occupies a portion 23 of RAM 18. Portion 23 typically has a capacity of only approximately 0.5 MB of memory in RAM 18 because the present invention uses an on-board memory management unit 16 to control the compression and storage of rendered data within RAM 18, thereby reducing operational memory capacity requirements.

Compression techniques for digital data are well-known in the art. Such techniques may rely on patterns in the data to reduce the storage requirements for the data. For example, in laser printer applications, the pattern of dots required to print a portion of a single line of text is relatively consistent across adjacent laser scan lines. The consistency of the pattern permits the data to be stored as compressed data in a manner which may occupy only fifty percent of the storage space which would be required to store the same data in an uncompressed format while still representing the same information. When necessary, compressed data may be decompressed to their original uncompressed form. Data compression is accomplished by employing a compression program to direct microprocessor 14 to compress the data. The compression program may also be called to direct microprocessor 14 to decompress data when necessary, such as for employment of data by microprocessor 14 for imaging.

In FIG. 3A, a compression program 24 occupies a segment 25 of portion 23 of memory 17. RAM 18 is preferably employed to store rendered data, which may be in the form of uncompressed data 26 stored, for example, in segment 27 of portion 23, or compressed data 28 stored, for example, in segment 29 of portion 23. During rendering, microprocessor 14 stores only uncompressed data 26 in RAM 18. As portion 23 of RAM 18 fills with uncompressed data 26, compression program 24 is called to compress uncompressed data 26 and store the result as compressed data 28. Because compressed data 28 occupy less space than uncompressed data 26, compression provides additional memory space for storage. The threshold at which compression program 24 is called may be determined dynamically by means of the software control program which directs memory management unit 16. Coordination of the storage and compression process is provided by memory management unit 16.

Preferably, RAM 18 is partitioned into a plurality of "pages" of equal size. For example, if RAM 18 is 0.5 MB in size, it may be partitioned into 256 pages, each 2 kilobytes ("kB") in size. Pages in RAM 18 are referred to as physical pages.

Figure 3B:
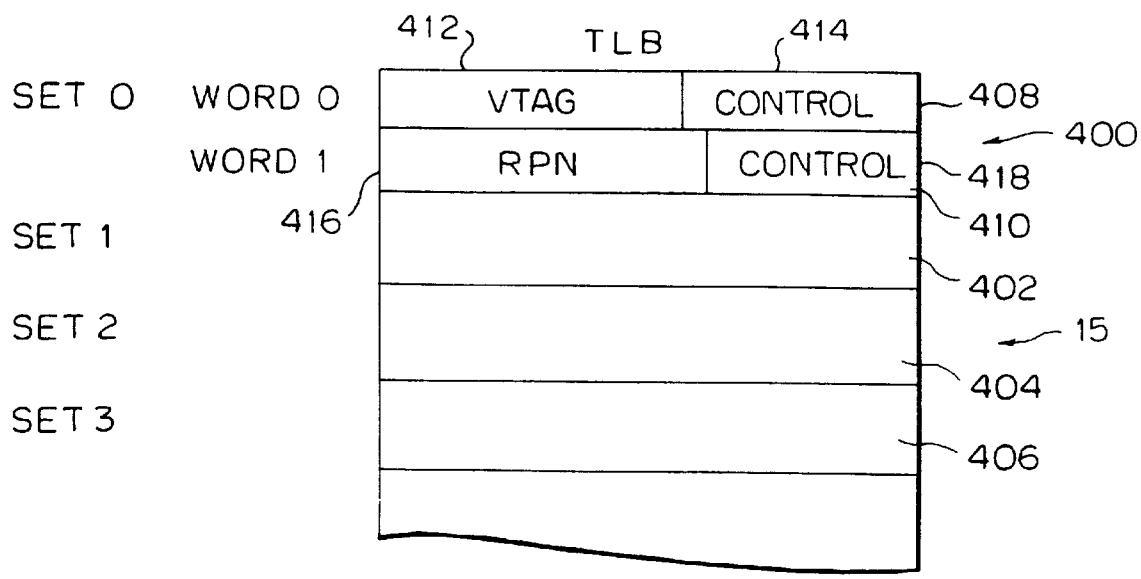
FIG. 3B is a block diagram of the translation lookaside buffer of FIG. 3A.

FIG. 3B is a block diagram of the translation lookaside buffer (TLB) 15 of FIG. 1. As illustrated in FIG. 3B, the TLB 15 is divided into a plurality of entries called sets, such as set 400, set 402, set 404 and set 406. There may be, for example, a total of 32 sets within TLB 15.

Set 400 is illustrated in greater detail in FIG. 3B. As illustrated in FIG. 3B, set 400 includes word 408 and word 410. Each word of words 408 and 410 may be, for example, 32 bits wide. Word 408 includes a first field of bits forming a virtual tag 412 and a second field of bits 414 containing control information. The control bits 414 may, for example, enable reading and writing operations and contain task identification information. Word 410 includes a first field 416 of bits defining a real page number (RPN) and a second field of bits 418 containing control information.

Figure 3C:
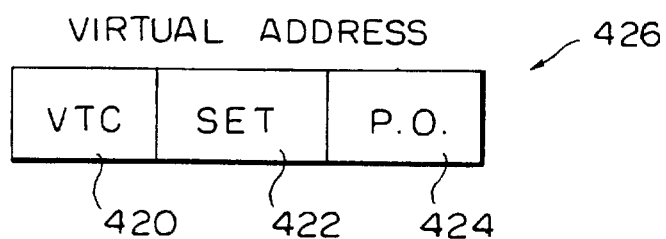
FIG. 3C is a block diagram illustrating the format of a virtual address as used by the microprocessor of FIG. 1.

FIG. 3C is a block diagram illustrating a virtual address 426 as used by the microprocessor 14 of FIG. 1. As illustrated, the virtual address 426 includes a first field of bits 420 forming a virtual tag comparison (VTC), a second field of bits 422 forming a set select and a third field of bits 424 forming a page offset. The microprocessor 14 (FIG. 1) identifies data and instructions internally using virtual addresses formatted as illustrated in FIG. 3C. A plurality of virtual addresses such as virtual address 426 form the virtual address space of the microprocessor 14. The MMU 16, including the TLB 15, receives a virtual address such as virtual address 426 from the microprocessor 14 and translates the virtual address 426 into a physical address. The physical address defines the actual location in the memory 17 where data are stored and read under control of MMU 16.

For purposes of address translation, the virtual address space is preferably partitioned into regions of fixed size, called virtual pages. Virtual pages are mapped into equivalent-sized regions of physical memory called physical pages or page frames. All accesses to instructions or data contained within a given page use the same virtual to physical address translation.

To perform an address translation, the microprocessor 14 provides a virtual address to the memory management unit 16. For example, the microprocessor 14 accesses the TLB set (400, 402, 404, 406) whose address is given by set field 422 of the virtual address. Within the accessed set, the VTAG field 412 (FIG. 3B) is compared to the virtual tag comparison (VTC) field 420 of the virtual address 426 (FIG. 3C). For an address translation to be valid, the VTC field 420 must match the VTAG field 412. If the address translation is valid for one TLB entry in the selected set, the real page number (RPN) field 416 in this entry is used to form the physical address to be accessed.

The RPN field 416 gives the portion of the physical address that depends on the translation. The remaining portion of the virtual address 426, the page offset (PO) 424, does not vary with address translation. The page offset 424 comprises the low-order bits of the virtual address 426 and gives the location of a byte within the virtual page. This byte is located at the same position in the physical address frame, so the page offset 424 also comprises the low-order bits of the physical address. The physical address, which may be for example, 32 bits, is preferably the concatenation of the RPN field 416 and the page offset 424. If the address translation is valid, the physical address produced by the translation is provided to the memory 17 (FIG. 1) to read or write data in the memory 17.

Operation of the memory management unit 16, including the translation lookaside buffer 15, as described herein is well known in the art and is commonly used with microprocessors. One example of a microprocessor employing a translation lookaside buffer for address translation is the Am29030 microprocessor available from Advanced Micro Devices, Inc., Sunnyvale, Calif.

FIG. 4 illustrates memory usage in a computer peripheral device employing the present invention. FIGS. 4A–4J show memory usage at different times during operation of RAM 18, that is, as RAM 18 fills with rendered data. In FIGS. 4A–4J, the memory space labelled "virtual" represents virtual memory 60 addressed by microprocessor 14. The memory space labelled "physical" represents the physical memory 70 comprising RAM 18.

The relationship between virtual and physical memory is controlled by memory management unit 16, under the direction of a software control program. Microprocessor 14 communicates a virtual address to memory management unit 16. Memory management unit 16 in conjunction with translation lookaside buffer 15, uses the virtual address to calculate a physical address which is then communicated to physical memory.

In the following discussion of the detailed operation of the present invention, it is to be understood that all references to the memory management unit 16 include the translation lookaside buffer 15, used for translating virtual to physical addresses as described above.

Both virtual and physical memory are preferably partitioned into pages. In FIG. 4, virtual memory is partitioned into virtual pages 102, 104, 106, 108, 110, 112, and physical memory is partitioned into physical pages 132, 134, 136. It is to be understood that both virtual memory 60 and physical memory 70 may generally be partitioned into any number of pages and that FIG. 4 shows physical memory 60 and virtual memory 70 divided into six and three pages, respectively, for illustrative purposes only. Some of virtual pages 102, 104, 106, 108, 110, 112 and some of physical pages 132, 134, 136 may be designated for storage of rendered data and others may be designated for storage of other data.

Figure 4A:
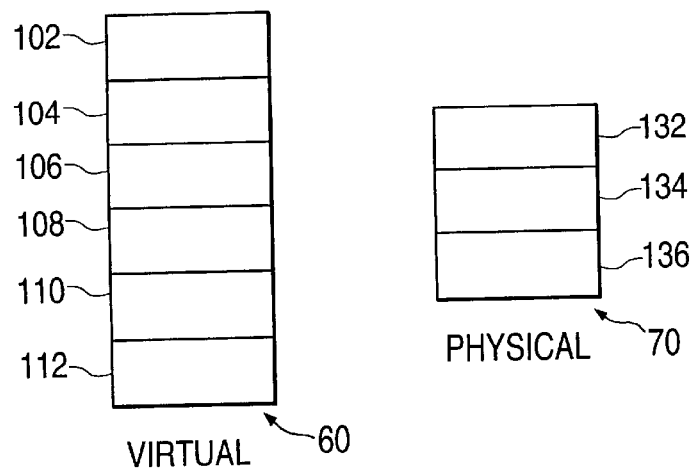
FIG. 4 is a schematic diagram illustrating memory usage during operation of a computer peripheral device employing the present invention.

In FIG. 4A, both virtual memory 60 and physical memory 70 are initially empty.

Figure 4B:
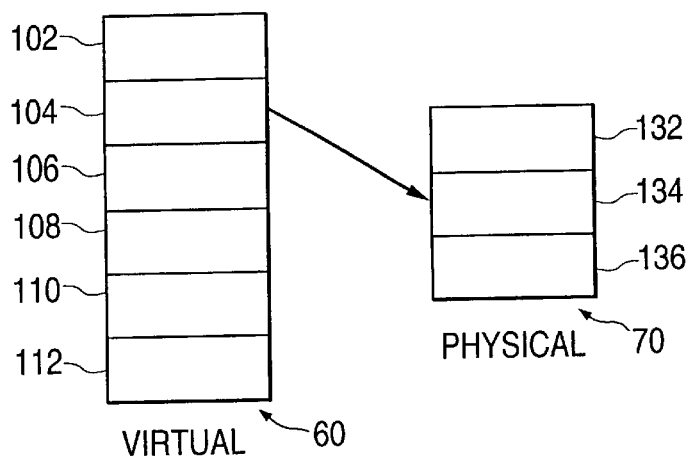

In FIG. 4B, microprocessor 14 has accessed virtual page 104 of virtual memory 60. Memory management unit 16 has allocated physical page 134 of physical memory 70. By allocating physical page 134 for virtual page 104, memory management unit 16 has directed that data written by microprocessor 14 to virtual page 104 will be physically written to physical page 134. The allocation of physical page 134 for virtual page 104 is indicated by the arrow drawn in FIG. 4B.

Figure 4C:
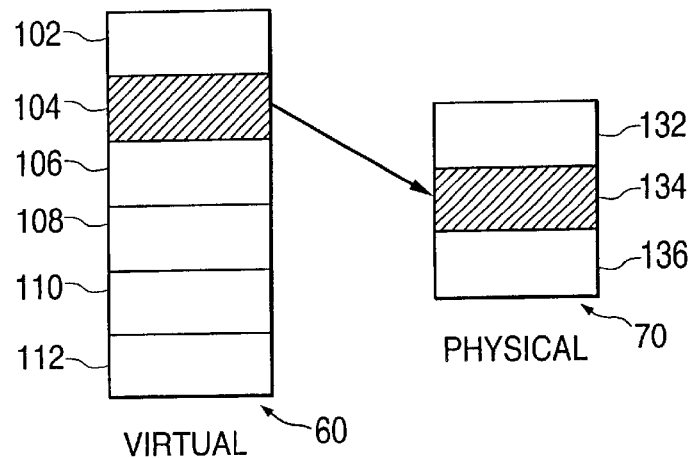

In FIG. 4C, virtual page 104 and physical page 134 contain rendered data in the form of uncompressed data 26, as shown by single cross-hatching.

Figure 4D:
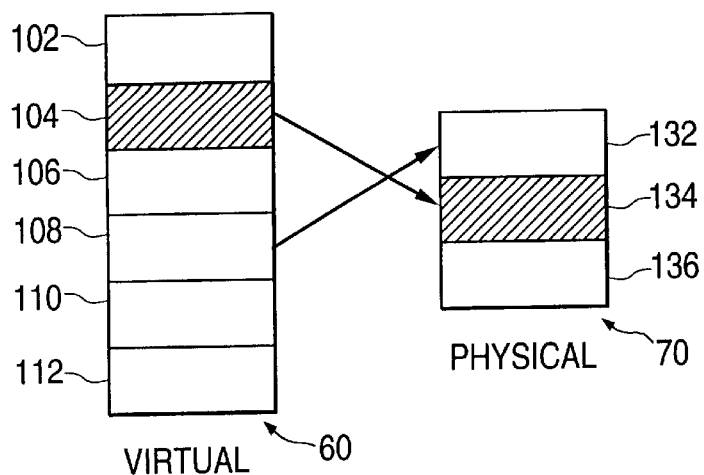

In FIG. 4D, microprocessor 14 has accessed virtual page 108. Memory management unit 16 has accordingly allocated physical page 132, as indicated by the arrow drawn between virtual page 108 and physical page 132.

Figure 4E:
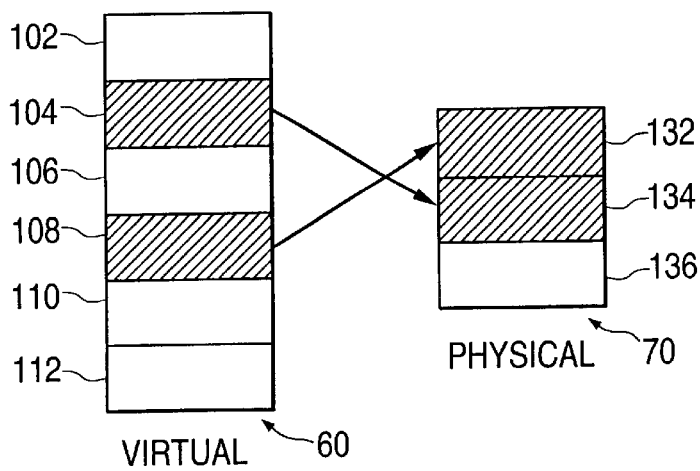

In FIG. 4E, virtual pages 104 and 108 and physical pages 132 and 134 contain rendered data in the form of uncompressed data 26, as shown by single cross-hatching.

Figure 4F:
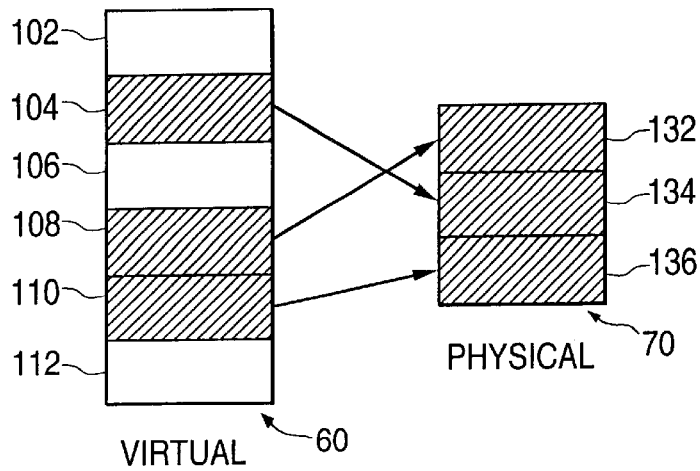

In FIG. 4F, microprocessor 14 has accessed virtual page 110. Memory management unit 16 has accordingly allocated physical page 136, as indicated by the arrow drawn between virtual page 110 and physical page 136. Virtual page 110 and physical page 136 contain rendered data in the form of uncompressed data 26, as shown by single cross-hatching. All physical pages available for rendered data have been allocated.

Figure 4G:
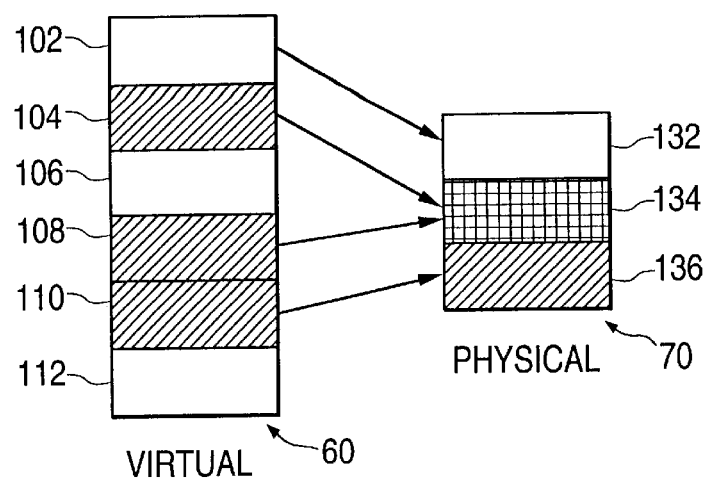

In FIG. 4G, when memory management unit 16 senses that a predetermined number of physical pages 132, 134, 136 have been allocated and an additional page is needed for allocation, memory management unit 16 calls compression program 24 (see FIG. 3, not shown in FIG. 4). The predetermined number of physical pages may be all physical pages available for rendered data or may be some lesser number. Memory management unit 16 directs compression program 24 to compress uncompressed data 26 (FIG. 3) stored in physical pages 132 and 134.

Typically, in the preferred embodiment of the present invention, after compression, data occupy less than half the amount of storage space occupied before compression. As a result, rendered data in physical page 132 and physical page 134 may be stored together in the form of compressed data 28 (FIG. 3) in physical page 134. This is indicated by double cross-hatching in FIG. 4G. Memory management unit 16 directs compression of two pages (physical page 132 and physical page 134) of uncompressed data 26 into compressed data 28 and storage of the compressed data 28 into a single page (physical page 134) of RAM 18. This leaves one page (physical page 132) empty. After compression thus frees physical page 132 to again accommodate storage of data, memory management unit 16 then allocates physical page 132 for virtual page 102 and directs microprocessor 14 to resume writing rendered data to virtual page 102. Allocation is indicated in FIG. 4G by the arrow drawn between virtual page 102 and physical page 132.

Figure 4H:
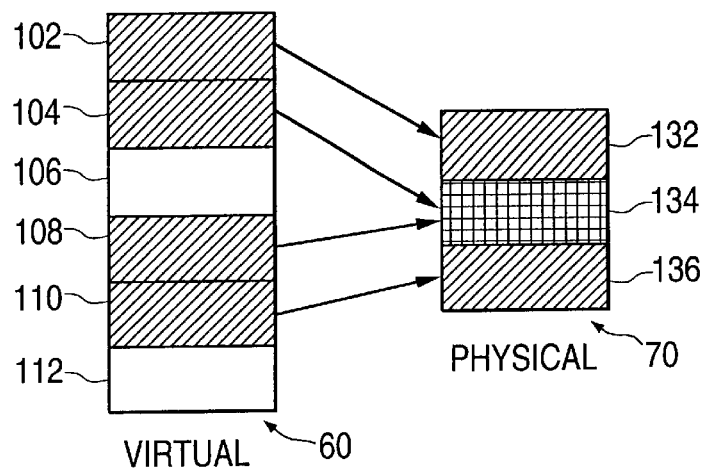

In. FIG. 4H, virtual page 102 and physical page 132 contain rendered data in the form of uncompressed data 26, as shown by single cross-hatching.

Figure 4I:
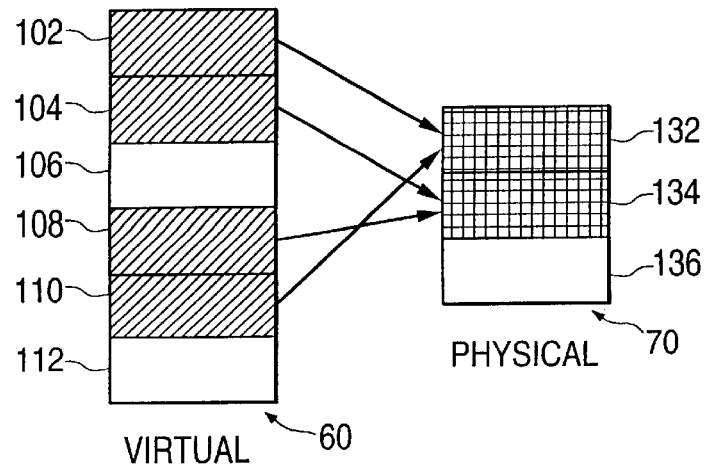

In FIG. 4I, when memory management unit 16 senses that a predetermined number of physical pages 132, 134, 136 have been allocated and an additional page is needed for allocation, memory management unit 16 calls compression program 24. Memory management unit 16 directs compression program 24 to compress uncompressed data 26 stored in physical pages 132 and 136. Rendered data stored in physical page 132 and physical page 136 are stored together in the form of compressed data 28 in physical page 132. This is indicated by double cross-hatching in FIG. 4I.

Compression thus frees physical page 136 to again accommodate storage of data. Memory management unit 16 then allocates physical page 136 for virtual page 112, as indicated by the arrow drawn between virtual page 112 and physical page 136 in FIG. 4J. Memory management unit 16 then directs microprocessor 14 to resume writing rendered data to virtual page 112.

After data for an entire printed page are rendered and stored in RAM 18, the data must be sequentially accessed to operate engine 22 of the laser printer for imaging. The process of retrieving data from RAM 18 proceeds in essentially reverse order of the process by which data are stored. Memory management unit 16 calls compression program 24 to decompress compressed data 28. As a result of such decompression, data is stored in RAM 18 as uncompressed data 26. Uncompressed data 26 can then be accessed by microprocessor 14 to operate engine 22 for imaging. This process of decompressing and transmitting continues until all data in RAM 18 have been decompressed and accessed and the entire page is imaged.

An important feature of the preferred embodiment of the present invention is the ability of memory management unit 16 to direct movement of data among pages in either compressed or uncompressed form. Movement of data is necessary in order to allow microprocessor 14 to access portions of RAM 18 in which rendered data have been stored and compressed, such as when a graphical border is placed around text. Memory management unit 16 directs the decompression and the movement of data to a free page where they are accessed by microprocessor 14.

Figure 4J:
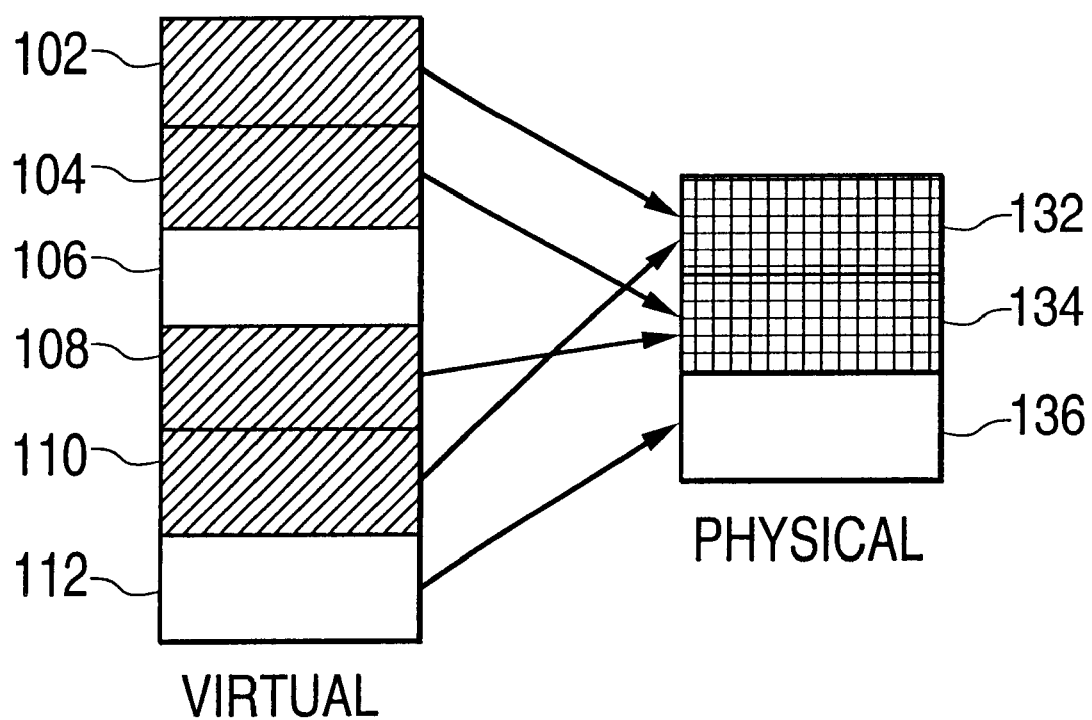

As an example, in FIG. 4J, physical page 132 may contain rendered data corresponding to a portion of the top of the page to be printed, including a portion of the first line of text. If the next data rendered by microprocessor 14 correspond to a graphical border to be placed adjacent the first line of text, microprocessor 14 must store those data in the appropriate locations in physical page 132. To enable microprocessor 14 to access data in physical page 132, memory management unit 16 will direct compression program 24 to decompress compressed data 28 in physical page 132. Uncompressed data 26 which results from such decompression will be stored in physical page 136. Since the data are now in uncompressed form, they can be accessed by microprocessor 14. Microprocessor 14 stores rendered data in physical page 136 as directed by memory management unit 16. If more data are rendered requiring additional space for storage, memory management unit 16 may call compression program 24 to compress uncompressed data 26 in physical page 136 and store the resultant compressed data 28 in physical page 132.

FIG. 5 is a schematic flow chart illustrating the method of using the memory management unit of the present invention.

In FIG. 5, microprocessor 14 provides a virtual address to memory management unit 16. The virtual address may be representative of the location where a page of rendered data is to be stored or accessed. Memory management unit 16 translates the virtual address to the physical address in RAM 18 where data are actually located. For example, memory management unit 16 may add an offset to the virtual address to obtain the physical address of the desired page in RAM 18.

In FIG. 5, memory management unit 16 determines at block 200 whether the virtual address corresponds to a physical address without software assistance or additional information. If so, a hit condition results and memory management unit 16 provides the physical address to microprocessor 16, which in turn accesses RAM 18. If not, a miss condition results and memory management unit 16 must determine the physical address.

To calculate the physical address, memory management unit 16 first determines at block 202 whether the addressed virtual page (the target page) is in memory. In a manner well known in the art, memory management unit 16 manages the physical location of pages of data addressed virtually by microprocessor 14. If the virtual address used by microprocessor 14 does not correspond to the physical address of the page, memory management unit 16 must set up a memory management unit entry which correlates the physical and virtual addresses. For example, memory management unit 16 may calculate the offset required to determine an appropriate physical page address for the virtual page address provided by microprocessor 14. If the addressed virtual page is in memory, as when data have been previously written to the target page and microprocessor 14 attempts to write additional data to the target page, then memory management unit 16 determines at block 204 whether the addressed virtual page contains uncompressed data. If so, block 206 directs memory management unit 16 to set up the memory management unit entry. Memory management unit 16 then calculates an appropriate physical address and provides the physical address to microprocessor 14.

If the target page is in memory but is not uncompressed, i.e., the data in the page are in compressed format, memory management unit 16 determines at block 208 whether there is an unused page of memory available. If so, block 210 directs memory management unit 16 to allocate a page of memory to accept the data contained in the target page. Allocation may include, for example, moving address pointer 32 (FIG. 4) to the start of a page and setting logical flags to permit reading, writing or both to that page. At block 212, memory management unit 16 calls compression program 24 to decompress the compressed data and store the data in the allocated page. Memory management unit 16 then sets up the memory management unit entry at block 206.

If no unused page of memory is available, memory management unit 16 determines at block 214 whether there is a page of uncompressed memory in use. If not, RAM 18 is full of compressed data, block 216 directs memory management unit 16 to return a fail condition, and no further data may be stored. If RAM 18 contains a page of in-use uncompressed data, block 218 directs memory management unit 16 to call compression program 24 to compress that page of uncompressed data. After compression, memory management unit 16 then determines, at block 208, whether there is now an unused page of memory available. Since compression program 24 compressed data to free up a page, an unused page is now available and memory management unit 16 allocates that page for storage at block 210. Block 212 then directs memory management unit 16 to call compression program 24 to decompress the compressed data in the target page, then block 206 directs memory management unit 16 to set up the memory management unit entry.

Alternatively, at block 202, if the target page is not already in memory, as when microprocessor 14 is rendering data for that page for the first time, memory management unit 16 must determine at block 208 whether there is an unused page of memory available to serve as the target page. If so, block 210 directs memory management unit 16 to allocate that page, then block 206 directs memory management unit 16 to set up the memory management unit entry. If no memory is available for the target page, memory management unit 16 determines at block 214 whether there is a page of uncompressed memory in use. If not, a fail condition results at block 216 since RAM 18 is full of compressed data. If there is a page of uncompressed data available, at block 218 memory management unit 16 calls compression program 24 and directs compression program 24 to compress that page of uncompressed data. After compression, memory management unit 16 then determines at block 208 whether there is now an unused page of memory available. Since at this time compression program 24 already has compressed data to free up a page, an unused page is now available and memory management unit 16 allocates that page for storage at block 210. Memory management unit 16 then sets up the memory management unit entry for calculation of the physical address at block 206.

The ability of memory management unit 16 and compression program 24 to move, compress and decompress data allows a laser printer or other computer peripheral device employing the present invention to be made with less RAM. However, the laser printer or other device is effectively somewhat slower than prior art designs because of the above-described need to compress, move and decompress data. Thus, the present invention trades a somewhat slower operating speed for reduced memory requirements.

In addition to reduced memory requirements, the present invention provides a capability to effectively offer a 0.5 MB increase in memory capacity at substantially the same cost as prior art devices. That is, with 1.0 MB RAM, the present invention provides substantially identical functionality to a prior art design computer peripheral device using 1.5 MB.

It is to be understood that, while the detailed drawings and specific examples given describe preferred embodiments of the invention, they are for the purpose of illustration, that the apparatus of the invention is not limited to the precise details and conditions disclosed and that various changes may be made therein without departing from the spirit of the invention which is defined by the following claims:

I claim:

1. A system for managing data in a peripheral device, said device being responsive to a host computer, the system comprising:

a processing means for receiving said data from said host computer and for processing said data;

a memory means coupled with said processing means for receiving said data from such processing means and for storing said data, said memory means comprising a plurality of storage locations, said memory means receiving a physical address corresponding to one storage location of said plurality of storage locations, said memory means storing said data at a storage location corresponding to said physical address;

a memory management unit for controlling communication of said data between said processing means and said memory means, said memory management unit being coupled with said processing means and with said memory means, said memory management unit receiving a virtual address from said processing means, determining said physical address from said virtual address, and providing said physical address to said memory means; and a compression means for reading said data stored in a first predetermined number of said plurality of storage locations, compressing said data to produce compressed data, and storing said compressed data in a second predetermined number of said plurality of storage locations, said second predetermined number being less than said first predetermined number;

said memory management unit determining an amount of said data stored within said memory means and generating a compression signal when said amount exceeds a predetermined threshold;

said compression means responding to said compression signal to compress said data.

2. A system for managing data as recited in claim 1 wherein said plurality of storage locations is arranged in an ordered array of subsets of storage locations.

3. A system for managing data as recited in claim 2 wherein said memory management unit determines said amount of said data stored within a particular subset of said ordered array of subsets of storage locations and generates said compression signal when said amount exceeds a predetermined threshold within said particular subset.

4. A system for managing data as recited in claim 2 wherein said memory management unit controls communication of said data between a first subset of said ordered array of subsets of storage locations and a second subset of said ordered array of subsets of storage locations.

5. A system for managing data as recited in claim 4 wherein said memory management unit controls communication of said data from said first subset to said second subset after said compression means has effected said compressed storage of said data within said second subset.

6. A method for managing data in a peripheral device responsive to a host computer, the method comprising:

transmitting said data from said host computer;

determining a virtual storage address for storing said data and determining from said virtual storage address a plurality of physical storage addresses for storing said data in a storage device;

routing said data to said storage device, said storage device being integral to said peripheral device, said storage device including a plurality of storage locations, each storage location of said plurality of storage locations corresponding to a physical storage address of said plurality of physical storage addresses;

storing said data in said storage device at said plurality of storage locations;

compressing said data stored in a first predetermined number of storage locations of said plurality of storage locations within said storage device to produce compressed data when the quantity of data stored in said storage device exceeds a predetermined threshold, and storing said compressed data in a second predetermined number of storage locations of said plurality of storage locations, said second predetermined number of storage locations being less than said first predetermined number of storage locations.

7. A method for managing data in a peripheral device as recited in claim 6 wherein said plurality of storage locations is arranged in an ordered array of subsets of storage locations.

8. A method for managing data in a peripheral device as recited in claim 7 wherein the method further includes the step of communicating said data between a first subset of said ordered array of subsets of storage locations and a second subset of said ordered array of subsets of storage locations.

9. A system for managing storage of data in a computer peripheral device, said computer peripheral device being responsive to a host computer, the system comprising:

processing means for receiving said data from said host computer and for controlling said computer peripheral device;

memory means coupled with said processing means for receiving said data from said processing means and for storing said data, said memory means comprising a plurality of blocks, each block of said plurality of blocks comprising a plurality of storage locations, said memory means receiving a physical address corresponding to at least one storage location of said plurality of storage locations, said memory means storing said data at said at least one storage location corresponding to said physical address;

a memory management unit coupled with said processing means and said memory means for controlling communication of said data between said processing means and said memory means, said memory management unit receiving from said processing means a virtual address and calculating said physical address from said virtual address, said memory management unit providing said physical address to said memory means, said memory management unit determining an amount of said data stored within said memory means and generating a compression signal when said amount exceeds a predetermined threshold; and compression program means responsive to said compression signal for reading said data stored in a first predetermined number of storage locations of a first respective block of said plurality of blocks, compressing said data to produce compressed data, and storing said compressed data in a second predetermined number of storage locations, said second predetermined number being less than said first predetermined number.

10. A system for managing storage of data in a computer peripheral device as recited in claim 9 wherein each storage location of said second predetermined number of storage locations is within said first respective block.

11. A system for managing storage of data in a computer peripheral device as recited in claim 9 wherein each storage location of said second predetermined number of storage locations is within a second respective block of said plurality of blocks.

12. An apparatus for managing data in a computer peripheral device, the device including a memory for storing said data, said memory including a plurality of storage locations, each storage location of said plurality of storage locations having a physical address, said memory receiving data to be stored and a target physical address, said memory storing said data to be stored at the storage location defined by said target physical address, the device being responsive to a host computer, the apparatus comprising:

a processor coupled with said memory, said processor receiving said data from said host computer; said processor processing said data received from said host computer to generate processed data; said processor storing said processed data in said memory;

a memory management unit for controlling communication of said data between said processor and said memory, said memory management unit receiving a virtual address from said processor, calculating said target physical address from said virtual address, and conveying said target physical address to said memory, said memory management unit determining an amount of said processed data stored within said memory and generating a compression signal when said amount exceeds a predetermined threshold; and a compression unit responsive to said compression signal for reading said processed data stored in a first predetermined number of said plurality of storage locations, compressing said processed data to produce compressed data, and storing said compressed data in a second predetermined number of said plurality of storage locations, said second predetermined number being less than said first predetermined number.

13. An apparatus for managing data in a computer peripheral device as recited in claim 12 wherein the device comprises a laser printer for producing a graphic image representative of said data.

\* \* \* \* \*